United States Patent [19]

Nebelung et al.

[11] Patent Number: 4,529,432
[45] Date of Patent: Jul. 16, 1985

[54] TAKE-OUT MECHANISM FOR A GLASSWARE FORMING MACHINE

[75] Inventors: Hermann H. Nebelung; Fritz Futterknecht, both of Zurich, Switzerland

[73] Assignee: Emhart Industries, Inc., Farmington, Conn.

[21] Appl. No.: 639,049

[22] Filed: Aug. 9, 1984

[30] Foreign Application Priority Data

Aug. 26, 1983 [GB] United Kingdom ............... 8322965

[51] Int. Cl.³ .............................................. C03B 9/44
[52] U.S. Cl. ....................................... 65/260; 65/239; 65/241
[58] Field of Search ........................... 65/239, 241, 260

[56] References Cited

U.S. PATENT DOCUMENTS

1,935,739  11/1933  Freese ............................ 65/260 X
3,559,425   2/1971  Irwin et al. ..................... 65/239 X

Primary Examiner—Arthur Kellogg
Attorney, Agent, or Firm—H. Samuel Kieser

[57] ABSTRACT

The take-out mechanism is operable to remove articles from the mould of a glassware forming machine. Two gripper member supports are mounted on a horizontal shaft for arcuate movement and driving means is operable to move the support to move grippers mounted on the supports. The supports are moved by moving two racks past the shaft on opposite sides of the shaft each rack being meshed with teeth on a surface of the support.

7 Claims, 5 Drawing Figures

TAKE-OUT MECHANISM FOR A GLASSWARE FORMING MACHINE

BACKGROUND OF THE INVENTION

This invention is concerned with a take-out mechanism for a glassware forming machine operable to remove articles from a mould of the glassware forming machine.

In glassware container forming machines of the so-called "individual section" type, a take-out mechanism is used to remove newly moulded articles of glassware from moulds of the machine and position them on a dead plate of the machine for subsequent removal to a conveyor which removes the articles from the machine. The take-out mechanism comprises two opposed gripping members movable towards one another into a gripping condition thereof and away from one another into a releasing condition thereof. The gripping members are mounted to turn as a unit about a horizontal axis to maintain an article gripped thereby in a vertical alignment as an arm on which the gripping members are mounted is moved in an arc about a further horizontal axis. Movement of the arm about the further horizontal axis moves the gripping members between a first position thereof at which they can grip an article in a mould of the machine and a second position thereof at which the gripping members can release the article on to the dead plate of the machine.

In a conventional take-out mechanism, the gripper members are mounted on gripper member supports which are pivoted together after the manner of scissors and are moved by a piston and cylinder assembly acting on a toggle which is linked to the gripper member supports. This conventional arrangement has many moving parts which limits its operating speed.

It is an object of the present invention to provide a take-out mechanism operable to remove articles from a mould of a glassware forming machine which has less moving parts than the conventional take-out mechanism described above and therefore is capable of operating at higher speeds.

BRIEF SUMMARY OF THE INVENTION

The invention provides a take-out mechanism operable to remove articles from a mould of a glassware forming machine, the mechanism comprising two opposed gripping members movable towards one another into a gripping condition thereof and away from one another into a releasing condition thereof, operating means operable to move the gripping members between their gripping and releasing conditions, a carrier for the gripping members, and moving means operable to move the carrier between a first position thereof at which the gripping members can grip an article and a second position thereof at which the gripping members can release the article on to a support, wherein the operating means comprises a horizontally-extending support shaft mounted on the carrier, two gripping member supports each mounted on the shaft for arcuate movement about a longitudinal axis of the shaft, each gripping member support having one of the gripping members mounted thereon, and driving means operable to move the gripping member supports arcuately about the longitudinal axis of the shaft simultaneously, one clockwise and the other anti-clockwise, so as to move the gripping members into their gripping or releasing conditions wherein the driving means comprises a first rack member extending on one side of the support shaft, the first rack member having teeth which are meshed with teeth formed on a surface of one of the gripping member supports which is arcuate about the longitudinal axis of the support shaft, a second rack member extending on the opposite side of the support shaft to the first rack member, the second rack member having teeth which are meshed with teeth formed on a surface of the other gripping member support which is arcuate about the longitudinal axis of the support shaft, and means for moving the first and the second rack members relative to the support shaft.

A take-out mechanism according to the last preceding paragraph has less moving parts than a conventional take-out mechanism and therefore can operate at higher speeds thereby enabling the glassware forming machine with which it is associated to achieve higher operating speeds also.

In order to enable the gripping members of the take-out mechanism to be changed rapidly, as is desirable when the glassware forming machine is changed from operating on one type of article to operating on a different type of article, each gripping member support may have a locating surface for a gripping member which surface forms an end of a vertically-extending slot in the gripping member support and the gripping member is releasably secured in the slot in engagement with the locating surface.

Since glassware forming machines frequently operate to manufacture two or more articles simultaneously so that the take-out mechanism must remove two articles from two adjacent moulds, the take-out mechanism may comprise one or more further pairs of opposed gripping members, one of each pair being mounted on each of the gripping member supports so that movement of the supports moves the further gripping members between gripping and releasing conditions thereof.

In some conventional take-out mechanisms, the gripping members are firmly held in their gripping condition so that articles gripped thereby do not swing relative to the carrier with the possible risk of damage to the article but are only held in their releasing condition by light pressure so that they can move relative to the carrier through small distances. Thus, when the moving means is moving the carrier towards its first position, there is a possibility that the gripping members will move relative to the carrier and collide with articles in the moulds of the machine thereby causing damage to the articles.

In order to avoid this possibility of collison between the gripping members and the articles in a take-out mechanism according to the invention, the means for moving the first and the second rack members relative to the support shaft may comprise an operating member mounted on the carrier for movement relative to the carrier in a first direction to cause the gripping members to move into their gripping condition or in an opposite direction to cause the gripping members to move into their releasing condition, and driving means operable to move the operating member in the first direction or in the opposite direction relative to the carrier, the mechanism also comprising locking means operable, when the gripping members are in their releasing condition, to lock the operating member and therefore the gripping members against movement relative to the carrier, said locking means being releasable by operation of the driving means.

Conveniently, said locking means comprises a locking member operatively connected to the operating member and mounted for movement into or out of a recess in said carrier so that, when the locking member is in the recess, the locking member, and therefore the operating member, is held against movement relative to the carrier, the driving means being effective to move said locking member into said recess as the gripping members are moved into their releasing condition.

Conveniently, said locking member is mounted on a lever pivotally mounted on the operating member and the lever also comprises an abutment member on which the driving means is arranged to act to move the operating member to bring the gripping members to their releasing condition, the lever being held against pivoting movement until the gripping members reach their releasing condition and then being pivotal by the action of the driving means to cause the locking member to enter said recess.

BRIEF DESCRIPTION OF THE DRAWINGS

There now follows a detailed description, to be read with reference to the accompanying drawings, of two take-out mechanisms which are illustrative of the invention. It is to be understood that the illustrative take-out mechanisms have been selected for description by way of example and not of limitation of the invention.

In the drawings.

DETAILED DESCRIPTION OF PREFERRED EMBODIMENTS OF THE INVENTION

The first illustrative take-out mechanism is operable to remove articles from a mould of a glassware forming machine of the individual section type. The mechanism comprises a first gripping member 10 and a second gripping member 12. The first and second gripping members 10 and 12 are opposed to one another and are movable towards one another into a gripping condition thereof (shown in FIG. 2) and away from one another into a releasing condition thereof. The gripping members 10 and 12 are mounted on a carrier of the illustrative take-out mechanism in the form of a yoke-shaped member 14. The illustrative take-out mechanism also comprises moving means (not shown) operable to move the member 14 between a first position thereof at which the gripping members 10 and 12 can grip an article and a second position thereof at which the gripping members 10 and 12 can release the article on to a support, formed by a dead plate of the glassware forming machine (not shown).

The moving means of the first illustrative take-out mechanism (not shown) may be an arm of conventional construction arranged to move in an arcuate path about a horizontal axis through approximately 180° to move the carrier from its first to its second position and means for causing the arm to move as aforesaid. The arm carries a shaft which is rotatable on the arm as the arm makes its arcuate movement so that when a carrier is secured to this shaft the carrier is maintained in vertical alignment as the arm makes its movement. Means for maintaining this vertical alignment by rotating the shaft relative to the arm are well known in the glassware industry and will not therefore be described herein. In order to mount the member 14 on the aforesaid shaft, the member 14 is secured to two brackets 16 which extend upwardly from the member 14 and are secured to the outside of a cylinder 18. The cylinder 18 has a cylinder head 20 bolted thereto which extends upwardly therefrom and is secured by a bolt 22 to an adaptor piece 24 which is secured by means of screws 26 to the aforesaid shaft of the arm.

The adaptor piece 24 defines two passages 28 by which air under pressure supplied through a bore in the aforesaid shaft can enter the adaptor piece. These passages 28 communicate with a passage 30 which extends vertically in the adaptor piece 24 and communicates with a vertical passage 32 in the cylinder head 20 which communicates with the interior of the cylinder 18. The cylinder 18 contains a piston 34 which is arranged to be moved downwardly in the cylinder 18 when air under pressure is introduced into the cylinder 18 through the passage 32. A return motion of the piston 34 is achieved by means of a spring 36 which bears on the member 14 and on a spring-retaining member 38 which is mounted on a piston rod 40 of the piston 34 which extends downwardly therefrom beyond the cylinder 18 and passes through a bore 42 in the member 14.

The piston and cylinder assembly 18 and 34 forms part of operating means of the first illustrative take-out mechanism operable to move the gripping members 10 and 12 between their gripping and releasing conditions. The operating means further comprises a horizontally-extending support shaft 44 which is supported by two downwardly extending arms of the member 14 so that it extends beneath the piston rod 40 of the piston 34. The operating means also comprises two gripping member supports 46 and 48 each mounted on the shaft 44 for arcuate movement about a longitudinal axis of the shaft 44, each gripping member support 46 and 48 having one of of the gripping members 10 and 12 mounted thereon, the member 10 being mounted on the support 46 and the member 12 being mounted on the support 48. As will appear from the description below, the piston and cylinder assembly 14, 34 constitutes driving means operable to move the gripping member supports 46 and 48 arcuately about the longitudinal axis of the shaft 44 simultaneously, one clockwise and the other anti-clockwise, so as to move the gripping members 10 and 12 into their gripping or releasing conditions.

Figure 1:
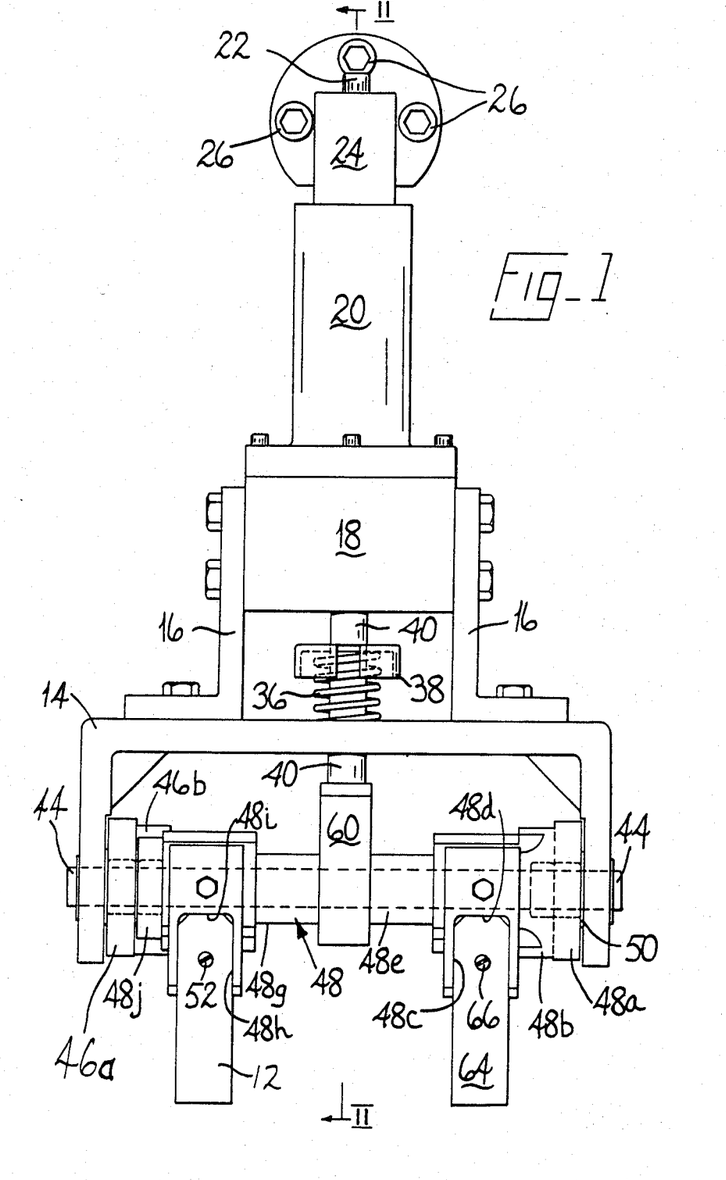
FIG. 1 is a side elevational view of the first illustrative take-out mechanism omitting the moving means thereof.
Figure 2:
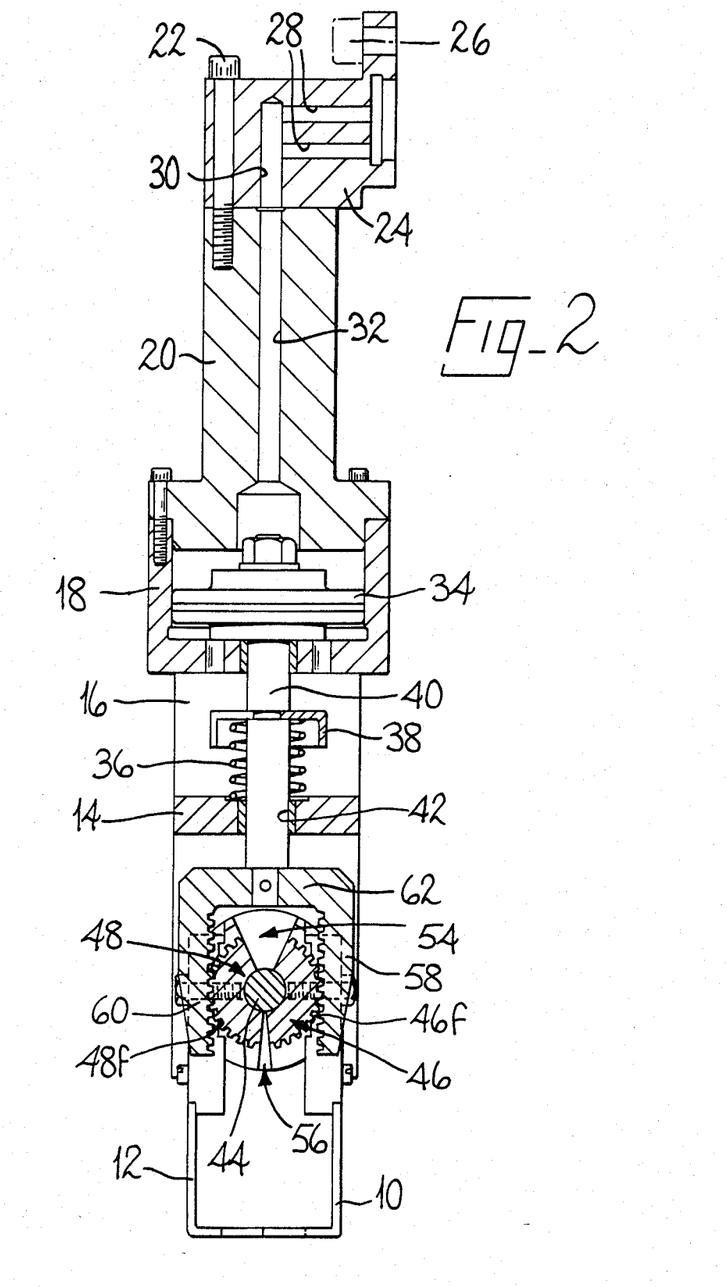
FIG. 2 is a cross-sectional view taken on the line II—II in FIG. 1.

The gripping member supports 46 and 48 are identical in construction but one is reversed relative to the other and relatively displaced so that a left hand end of the support 46 is identical to a right hand end of the support 48 and vice versa. Accordingly, only the support 48 will be described in detail hereinafter. The gripping member support 48 comprises a bearing bush portion 48a which is annular surrounding the shaft 44 and a thrust washer 50 acts between the bearing bush portion 48a and the member 14. The bearing bush portion 48a adjoins a slotted portion 48b of the support 48 which provides a guide for a bearing bush portion of the support 46 which is identical to a bearing bush portion 48j to be described with a further thrust washer (not visible in the drawings) acting between the portion 48a and the support 46. Adjoining the portion 48b is a portion of the support 48 which defines a vertically-extending slot 48c and has a locating surface 48d for a gripping member forming an upper end of the slot 48c. Adjoining the portion of the support 48 which defines the slot 48c is a joining portion 48e of the support 48 which adjoins a portion 48f (see FIG. 2) which has a surface which is arcuate about the longitudinal axis of the support shaft 44 and which has teeth formed thereon. This portion 48f of the support 48 also adjoins a joining portion 48g thereof which in turn adjoins a portion which defines a slot 48h similar to the slot 48c and has a locating surface 48i similar to the surface 48d. The gripping member 12 is received in the slot 48h and is secured in engagement with the surface 48i by means of a screw 52 which enters the support 48. The portion of the support 48 in which the slot 48h is formed adjoins a portion 48j which forms a bearing bush extending around the shaft 44 and guided in a groove in a portion 46b of the support 46 identical to the portion 48b aforementioned. A bearing bush portion 46a similar to the portion 48a of the support 48 is visible in FIG. 1. Between the bush portions 48a and 48j, the support 48 occupies only an arc of approximately 150° about the longitudinal axis of the shaft 44 (see FIG. 2). Thus, the two supports 46 and 48 occupy approximately 300° of the available 360° about the longitudinal axis of the shaft 44. When the gripping members 10 and 12 are in their gripping condition (as shown in FIG. 2), the supports 46 and 48 between their bearing bushes are separated by an upper segment 54 of approximately 50° and by a lower segment 56 of approximately 10° about the longitudinal axis of the shaft 44. Thus, each of the supports 46 and 48 is held on the shaft 44 by two bearing bushes (48a and 48j in the case of the support 48). Furthermore, each support 46 and 48 can move approximately 30° about the longitudinal axis of the shaft 44 before engaging the other support. The portion of the support 46 which has the arcuate surface 46f which corresponds to the surface 48f visible in FIG. 2. Further thrust washers 50 act between the member 14 and the portion 46a and between the portions 46a and 48j.

The driving means of the operating means for the gripping members 10 and 12 also comprises a first rack member 58 extending vertically on one side of the support shaft 44, the first rack member having teeth which are meshed with the teeth formed on the surface 46f, and a second rack member 60 extending vertically on the opposite side of the support shaft 44 to the first rack member 58, the second rack member 60 having teeth which are meshed with teeth formed on the surface 48f of the gripping member support 48. The rack members 58 and 60 are joined by a connecting portion 62 which extends above the shaft 44 and is secured to a lower end portion of the piston rod 40. The piston and cylinder assembly 18, 34 provides means for moving the first and the second rack members 58 and 60 vertically relative to the support shaft 44 to thereby cause the supports 46 and 48 to move arcuately about the longitudinal axis of the shaft 44 and to move the gripping members 10 and 12 between their gripping and releasing conditions.

When air under pressure is introduced into the cylinder 18, the piston 34 moves downwardly in the cylinder 18 and the rack members 58 and 60 are moved downwardly past the shaft 44. This causes the support 46 to turn clockwise on the shaft 44 (viewing FIG. 2) and the support 48 to move anti-clockwise so that the gripping members 10 and 12 approach one another into their gripping condition shown in FIG. 2. When the supply of air under pressure is removed from the cylinder 18, the spring 36 causes the piston 34 to move upwardly in the cylinder 18 and the blank members 58 and 60 to be moved upwardly relative to the shaft 44 so that the support 46 is moved anti-clockwise about the longitudinal axis of the shaft 44 and the support 48 is moved clockwise. This moves the gripping members 10 and 12 away from one another into their releasing condition (not shown).

In order to enable the first illustrative take-out mechanism to operate to take more than one article out at a time, the mechanism comprises two further opposed gripping members 64 (only one visible in FIG. 1), one of the gripping members 64 being mounted on each of the gripping member supports 46 and 48 so that movement of the supports 46 and 48 moves the further gripping members 64 between gripping and releasing conditions thereof in identical manner to the gripping members 10 and 12. The gripping members 64 are mounted in the slot 48c and its equivalent on support 46 by means of screws 66 in engagement with the locating surface 48d and its equivalent on support 46.

The second illustrative take-out mechanism is also operable to remove articles from a mould of a glassware forming machine of the individual section type. The mechanism comprises two opposed gripping members 70 and 72 which are movable towards one another into a gripping condition thereof (shown in FIG. 3) or away from one another into a releasing condition thereof (shown in FIG. 4). When in their gripping conditions, the gripping members 70 and 72 can grip an article in a mould of the machine (not shown) and, by movement into their releasing condition, can release the article on to a support provided by a dead plate (not shown) of the machine.

The second illustrative take-out mechanism comprises rack moving means operable to cause the gripping members 70 and 72 to move between their gripping and releasing conditions, a carrier 74 for the gripping members 70 and 72, and carrier moving means (not shown) operable to move the carrier 74 between a first position thereof at which the gripping members 70 and 72 can grip an article in a mould and a second position thereof at which the gripping members 70 and 72 can release the article on to a dead plate. The carrier moving means is of conventional construction and comprises an arm on which the carrier 74 is mounted, means for turning the arm back and forth through approximately 180° about a horizontal axis to move the carrier 74 between its first and its second positions, and means for maintaining the carrier 74 and an article gripped by the gripping members 70 and 72 in vertical alignment as the arm is turned about the horizontal axis.

The carrier 74 comprises an abutment 76 arranged to be mounted on the moving means aforementioned by bolts passing through bores 78 in the abutment 76. The abutment 76 is bolted by bolts 80 to a housing 82 which depends from the abutment 76. The housing 82 comprises an upper rectangular portion 82a enclosing a cylindrical space 82b and a lower rectangular portion 82c (larger than the portion 82a) enclosing a cylindrical space 82d which communicates with the space 82b and is coaxial therewith. The housing 82 is open at the bottom and is secured to an open-topped pneumatic cylinder 84 whose cylindrical space communicates with the space 82d and is coaxial therewith and of the same diameter.

The cylinder 84 of the carrier 74 has a bottom end cap 84a from which a housing 86 of the carrier 74 depends. The housing 86 supports a yoke-shaped member 88 of the carrier 74 which comprises a central portion 88a supported horizontally within the housing 86 and two depending end portions 88b (only one visible in the drawings). The portions 88b of the member 88 support opposite ends of a cylindrical shaft 90 of the carrier 74 which extends horizontally within the housing 86.

The aforementioned rack moving means of the second illustrative take-out mechanism comprises two holders 92 each having one of the gripping members 70 and 72 mounted thereon. The holders 92 are both mounted for turning movement on the shaft 90 and project through slots 86a in the housing 86 so that the gripping members 70 and 72 are carried outside the housing 86. Each holder 92 is mounted on the shaft 90 for turning movement about the horizontal longitudinal axis of the shaft 90. Each holder 92 has two annular end portions (not shown but similar to the portions 48a, and 48j of the first illustrative mechanism) which surround the shaft 90 and serve to retain the holders 92 on the shaft 90, the end portions of the respective holders 92 are spaced from one another longitudinally of the shaft 90, one of the annular end portions of each holder 92 being slidable in a groove in the other holder 92 while the other end portion is beyond the other holder 92. Over a central portion thereof between its annular end portions, each holder 92 occupies an arc of approximately 150° about the longitudinal axis of the shaft 90. Thus, the two holders 92 occupy approximately 300° and can each move through approximately 30° about said axis. A 30° movement of each holder (one clockwise and the other anti-clockwise) moves the gripping members 70 and 72 from their gripping condition to their releasing condition or vice versa.

At a central portion thereof, each of the holders 92 has a toothed surface 92a which is arcuate about the longitudinal axis of the shaft 90. The teeth of each surface 92a are meshed with teeth of one of two racks 94 of the operating means. The racks 94 extend vertically on opposite sides of the shaft 90 and are joined together by a bridge member 96 of the operating means which extends horizontally above the shaft 90 and is arranged to be moved vertically in the operation of the rack moving means. Vertical movement of the bridge member 96 causes the racks 94 to move vertically thereby causing the holders 92 to turn on the shaft 90 (one clockwise and the other anti-clockwise).

The rack moving means of the second illustrative take-out mechanism also comprises a vertically extending operating member 98 to a lower end of which the bridge member 96 is secured so that vertical movement of the operating member 98 causes vertical movement of the bridge member 96. The operating member 98 passes upwardly through bores in the central portion 88a of the yoke-shaped member 88 and in the bottom end cap 84a of the cylinder 84 and has an externally threaded upper end portion 98a within the upper portion 82a of the housing 82. The upper end portion 98a of the operating member 98 is threadedly received in a cylindrical upper portion 100a of a carrier member 100 of the operating member 98.

The carrier member 100 (see also FIG. 5), in addition to the upper cylindrical portion 100a thereof, comprises two opposed planar side portions 100b which depend from the portion 100a. The portions 100b depend one on each side of the operating member 97 and support an annular lower portion 100c of the carrier member 100 which is a sliding fit in the cylinder 84, the portion 100a being a sliding fit in the portion 82a of the housing 82 so that the member 100 is guided for vertical sliding movement.

A piston member 102 of the rack moving means is mounted on the operating member 98 for sliding movement relative to the member 98. The piston member 102 comprises a lower hollow cylindrical portion 102a surrounding the member 98. The portion 102a is located between the portion 88a of the yoke-shaped member 88 and the end cap 84a of the cylinder 84. The portion 102a serves to retain an upper end of a spring 104 of the rack moving means which acts between the portion 88a and the piston member 102. The piston member 102 also comprises a hollow cylindrical portion 102b which extends upwardly from the portion 102a thereof and passes through the bore in the end cap 84a. The piston member 102 also comprises a piston portion 102c which forms a piston and cylinder assembly with the cylinder 84, the portion 102c being joined to the portion 102b, and an upwardly-projecting hollow cylindrical portion 102d of the piston member 102 which terminates in a frusto-conical upper cam surface 102e. The operating member 98 passes centrally through the portions 102a, 102b, 102c and 102d of the pistion member 102 and has an external shoulder 98b which is in opposed relationship to an internal shoulder 102f of the piston portion 102c.

The rack moving means of the second illustrative take-out mechanism also comprises two pivot pins 110 each of which is supported between the two planar side portions 100b of the carrier member 100 so that one pin 110 extends horizontally on each side of the portion 102d of the piston member 102. On each of the pivot pins 110 an L-shaped slotted lever 112 of the rack moving means is pivotally mounted. One end portion of each lever 112 is pivotally mounted on the pin 110 and a centre portion of each lever supports a roller 114 which is arranged to enter a slot 116 in the operating member 98 when the gripping members 70 and 72 are in their gripping condition.

The second illustrative take-out mechanism also comprises locking means operable, when the gripping members 70 and 72 are in their releasing condition, to lock the operating member 98, and therefore the gripping members 70 and 72, against movement relative to the carrier 74. The locking means is carried on the carrier member 100 and comprises two rollers 118 one on each of the slotted levers 112, the rollers 118 being supported at the opposite ends of the levers 112 to the pivot pins 110. Each roller 118 provides a locking member operatively connected to the operating member 98 and mounted for movement into or out of a recess formed by an annular groove 120 in the portion 82c of the housing 82 of the carrier 74. When the roller 118 is in the groove 120, the roller 118, and therefore the operating member 98, is held against movement relative to the carrier 74.

The spring 104 and the piston and cylinder assembly 84, 102c provide (as will now be explained) driving means of the rack moving means operable to move the operating member 98 either in a first direction, vertically downwards, or in an opposite direction, vertically upwards. Movement of the operating member 98 is effective, as explained above, to move the gripping members 70 and 72 between their gripping and releasing conditions. The driving means is also effective to move said rollers 118 into said groove 120 as the gripping members 70 and 72 are moved into their releasing condition.

Figure 3:
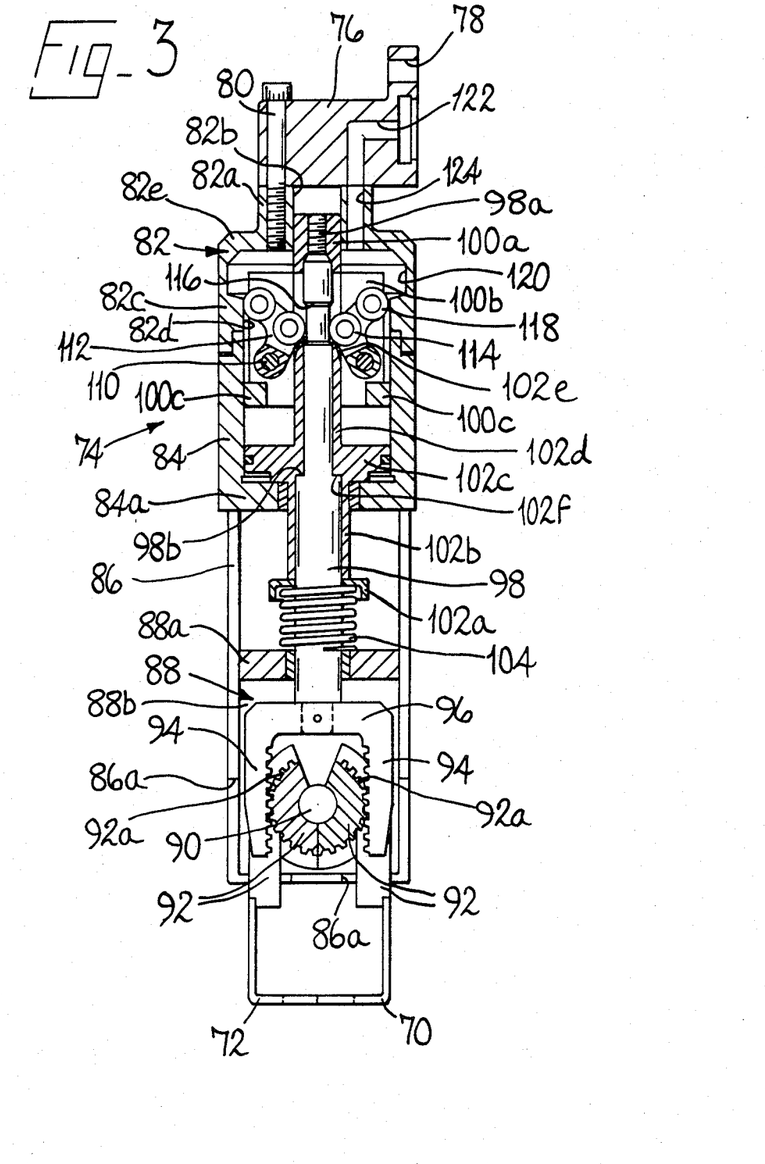
FIG. 3 is a vertical cross-sectional view similar to FIG. 2 but of the second illustrative take-out mechanism showing the gripping members thereof in their gripping condition.
Figures 4, 5:
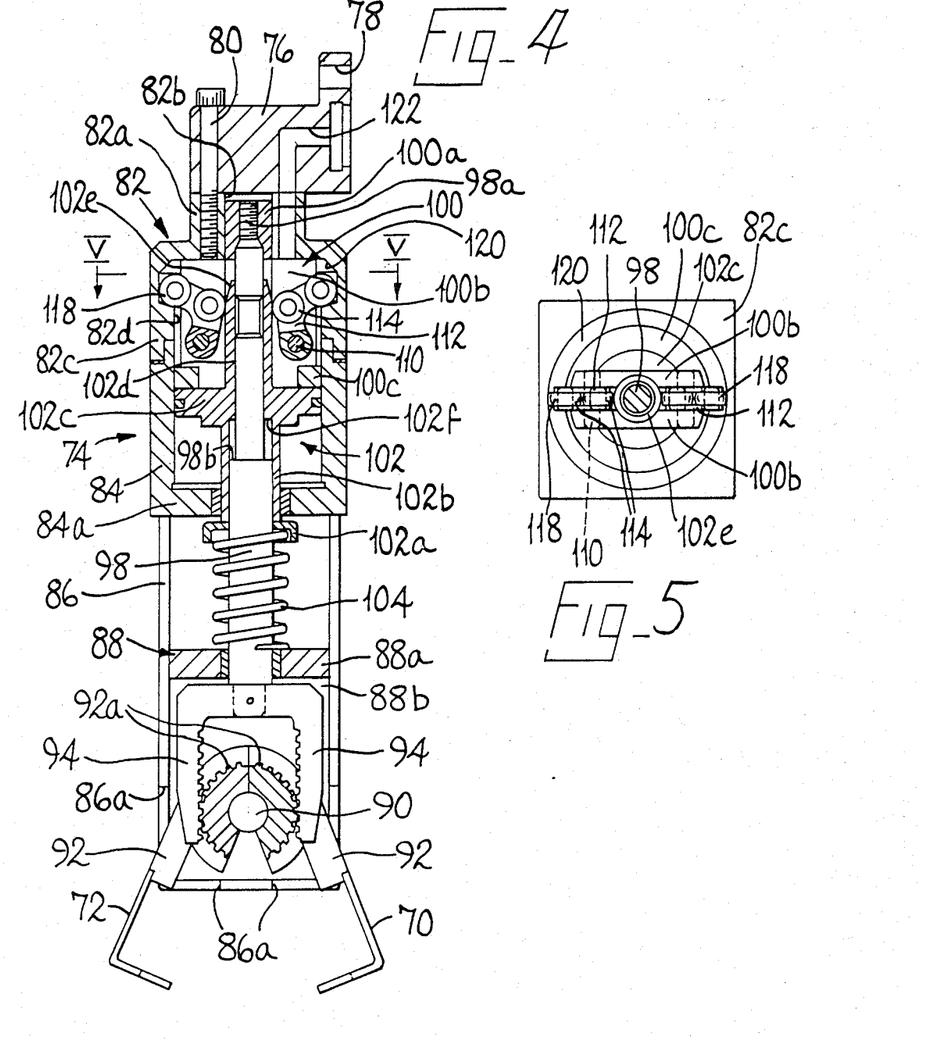
FIG. 4 is a view similar to FIG. 3 but showing the gripping members of the second illustrative take-out mechanism in their releasing condition.
FIG. 5 is a cross-sectional view taken on the line V—V in FIG. 4.

In order to move the operating member 98 downwards, air under pressure is introduced into a passage 122 through the abutment 76 which communicates with a passage 124 in the wall of the upper portion 82a of the housing 82. The passage 124 in turn communicates with the interior of the lower portion 82b of the housing 82. The air enters the cylinder 84 and acts to move the piston member 102 downwards by acting on the piston portion 102c thereof. The piston member 102 slides downwards on the operating member 98 compressing the spring 104 until the shoulders 98b and 102f come into engagement whereupon the operating member is moved downwards until the piston portion 102c engages the end cap 84a (this condition is shown in FIG. 3). The gripping members 70 and 72 are thus moved into their gripping condition.

In order to move the operating member 98 upwards, the passage 122 is connected to atmosphere so that air can escape from the cylinder 84. This allows the spring 104 (which was compressed during the downwards movement of the piston member 102) to press the piston member 102 upwardly. Initially the piston member 102 slides upwards on the operating member 98 opening a gap between the shoulders 98b and 102f. This continues until the frusto-conical upper cam surface 102e of the piston member 102 engages the rollers 114 which are in the groove 116 in the operating member 98. Since the levers 112 are prevented from pivoting about the pins 110 to remove the rollers 114 from the path of the piston member 102 by engagement of the rollers 118 on the interior wall of the housing 82, the operating member 98 is pressed upwardly by the action of the spring 104. This movement continues moving the gripping members 70 and 72 to their releasing condition (shown in FIG. 4) until the rollers 118 come opposite the groove 120 whereupon the levers 112 pivot on the pins 110 moving the rollers 112 out of the path of the piston member 102. The rollers 118 in the groove 120 lock the operating member against further movement and prevent the gripping members 70 and 72 from moving out of their gripping condition. The upward movement of the piston member 102 is terminated by engagement of the piston portion 102c with the annular lower portion 100c of the carrier member 100. The rollers 118 are held in the groove 120 by engagement between the rollers 114 and the outer surface of the portion 102d of the piston member 102 below the cam surface 102e. Upon a subsequent downwards movement of the piston member 102, the rollers 114 are released by the portion 102 for pivoting movement about the pins 110 so that the rollers 118 leave the groove 120 thereby unlocking the operating member for further movement.

We claim:

1. A take-out mechanism operable to remove articles from a mould of a glassware forming machine, the mechanism comprising two opposed gripping members movable towards one another into a gripping condition thereof and away from one another into a releasing condition thereof, operating means operable to move the gripping members between their gripping and releasing conditions, a carrier for the gripping members, and moving means operable to move the carrier between a first position thereof at which the gripping members can grip an article and a second position thereof at which the gripping members can release the article on to a support, wherein the operating means comprises a horizontally-extending support shaft mounted on the carrier, two gripping member supports each mounted on the shaft for arcuate movement about a longitudinal axis of the shaft, each gripping member support having one of the gripping members mounted thereon, and driving means operable to move the gripping member supports arcuately about the longitudinal axis of the shaft simultaneously, one clock-wise and the other anti-clockwise, so as to move the gripping members into their gripping or releasing conditions wherein the driving means comprises a first rack member extending on one side of the support shaft, the first rack member having teeth which are meshed with teeth formed on a surface of one of the gripping member supports which is arcuate about the longitudinal axis of the support shaft, a second rack member extending on the opposite side of the support shaft to the first rack member, the second rack member having teeth which are meshed with teeth formed on a surface of the other gripping member support which is arcuate about the longitudinal axis of the support shaft, and means for moving the first and the second rack members relative to the support shaft.

2. A take-out mechanism according to claim 1, wherein each gripping member support has a locating surface for a gripping member which surface forms an end of a vertically-extending slot in the gripping member support and the gripping member is releasably secured in the slot in engagement with the locating surface.

3. A take-out mechanism according to either one of claims 1 and 2, wherein the mechanism comprises one or more further pairs of opposed gripping members, one of each pair being mounted on each of the gripping member supports so that movement of the supports moves the further gripping members between gripping and releasing conditions thereof.

4. A take-out mechanism according to either one of claims 1 and 2, wherein the means for moving the first and the second rack members vertically relative to the support shaft comprises an operating member mounted on the carrier for movement relative to the carrier in a first direction to cause the gripping members to move into their gripping condition or in an opposite direction to cause the gripping members to move into their releasing condition, and driving means operable to move the operating member in the first direction or in the opposite direction relative to the carrier, the mechanism also comprising locking means operable, when the gripping members are in their releasing condition, to lock the operating member and therefore the gripping members against movement relative to the carrier, said locking means being releasable by operation of the driving means.

5. A take-out mechanism according to claim 4, wherein said locking means comprises a locking member operatively connected to the operating member and mounted for movement into or out of a recess in said carrier so that, when the locking member is in the recess, the locking member, and therefore the operating member, is held against movement relative to the carrier, the driving means being effective to move said locking member into said recess as the gripping members are moved into their releasing condition.

6. A take-out mechanism according to claim 5, wherein said locking member is mounted on a lever pivotally mounted on the operating member and the lever also carries an abutment member on which the driving means is arranged to act to move the operating member to bring the gripping members to their releasing condition, the lever being held against pivoting movement until the gripping members reach their releasing condition and then being pivotal by the action of the driving means to cause the locking member to enter said recess.

7. A take-out mechanism according to claim 6, wherein said locking member and said abutment member are provided by rollers.

* * * * *